March 21, 1967 J. B. BRAUER 3,310,761

TAPPED MICROWAVE ACOUSTIC DELAY LINE

Filed June 18, 1963 4 Sheets-Sheet 1

INVENTOR.
JOSEPH B. BRAUER

BY

Martin J. Finnegan
ATTORNEYS

TAPPED MICROWAVE ACOUSTIC DELAY LINE

Filed June 18, 1963

INVENTOR.
JOSEPH B. BRAUER

BY

Martin J. Finnegan
ATTORNEYS

INVENTOR.
JOSEPH B. BRAUER
BY
Martin J. Finnegan
ATTORNEYS

TAPPED MICROWAVE ACOUSTIC DELAY LINE

Filed June 18, 1963 4 Sheets-Sheet 4

INVENTOR.
JOSEPH B. BRAUER

United States Patent Office 3,310,761 Patented Mar. 21, 1967

3,310,761
TAPPED MICROWAVE ACOUSTIC DELAY LINE

Joseph B. Brauer, Rome, N.Y., assignor to the United States of America as represented by the Secretary of the Air Force Filed June 18, 1963, Ser. No. 288,845
6 Claims. (Cl. 333—30)

The invention described herein may be manufactured and used by or for the U.S. Government for governmental purposes without payment to me of any royalty thereon.

This invention relates to delay devices, and more particularly to means for achieving microwave memory or delay of an electromagnetic signal.

Microwave delay lines have utility in radar systems. For example, for various timing functions as in moving target indicators, or for memory units for information storage purposes for solving complex problems, or even for measuring performance of the radar system itself by observing the performance of the microwave delay apparatus at the radar's intermediate frequency.

It is known that the acoustic propagation effect provides a means for achieving microwave memory or delay of an electromagnetic signal. This is accomplished by employing a rod of piezoelectric material coupled to two reentrant cavities in such a manner that the incoming electromagnetic signals excite through piezoelectric action on the input face of the piezoelectric material an acoustic wave which then propagates through the intervening media with sonic velocity but at the frequency of the input signal. Upon reaching the output face of the media the piezoelectric action is reversed and the acoustic wave regenerates the electromagnetic signal in the output cavity at a reduced power level commensurate with the loss experienced due to less than perfect coupling at the input and output transducers and attenuation during propagation in the media.

Accordingly, an object of the present invention is to provide increased effective signal power transferred across or through the delay device.

Another object of this invention is to provide tapped or variable delay characteristics in microwave delay apparatus.

Still another object of this invention is to provide acoustic coupling between reentrant microwave cavities resulting in tapped delay devices.

These and other objects are accomplished in accordance with the present invention by combining the periodicity of a resonant microwave transmission structure and a shaped piezoelectric transducer and media to produce tapped or variable delay characteristics. In one embodiment of the invention a single input transmission line is coupled to the input transducer face of the delay media which is cut in steps corresponding to the individual length of delay path required and each output transducer face is coupled to a separate output transmission line thus providing a tapped delay line.

Further objects, features and advantages are discussed more fully in connection with the following detailed description of the drawings in which:

FIG. 1*a* is an illustration of the microwave delay paths;

FIG. 1*b* is a schematic cross-section view of one embodiment of my invention producing multiple delay paths of equal length to yield a stronger output signal;

FIG. 1c illustrates the periodicity of shorted transmission lines;

FIG. 2*a* is a schematic cross-section view of another embodiment producing multiple delay paths not of equal length;

FIG. 2*b* is a cross-section view of a piezoelectric media notched to provide more discrete outputs at each maximum power point;

FIG. 3*a* is a schematic cross-section view of still another embodiment producing multiple but unequal delay paths;

FIG. 3*b* is a cross-section view of a piezoelectric media notched for effective shorting of output transmission lines;

Figure 1A:
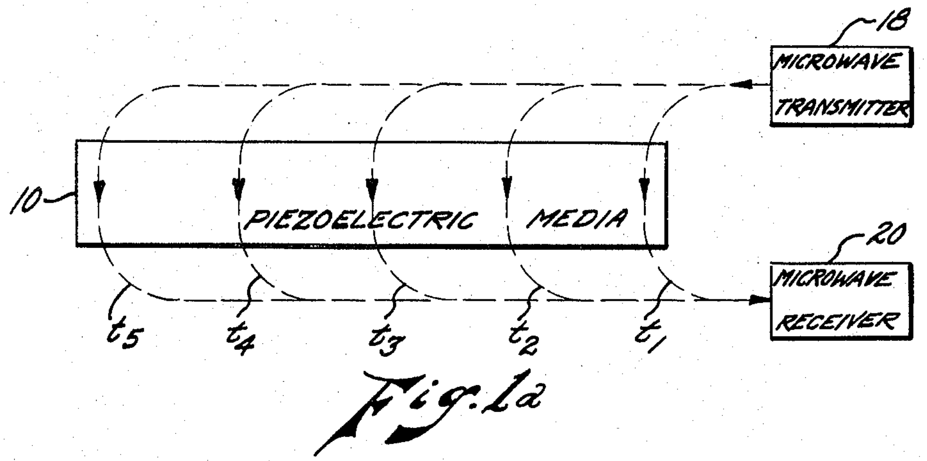
Figure 1B:
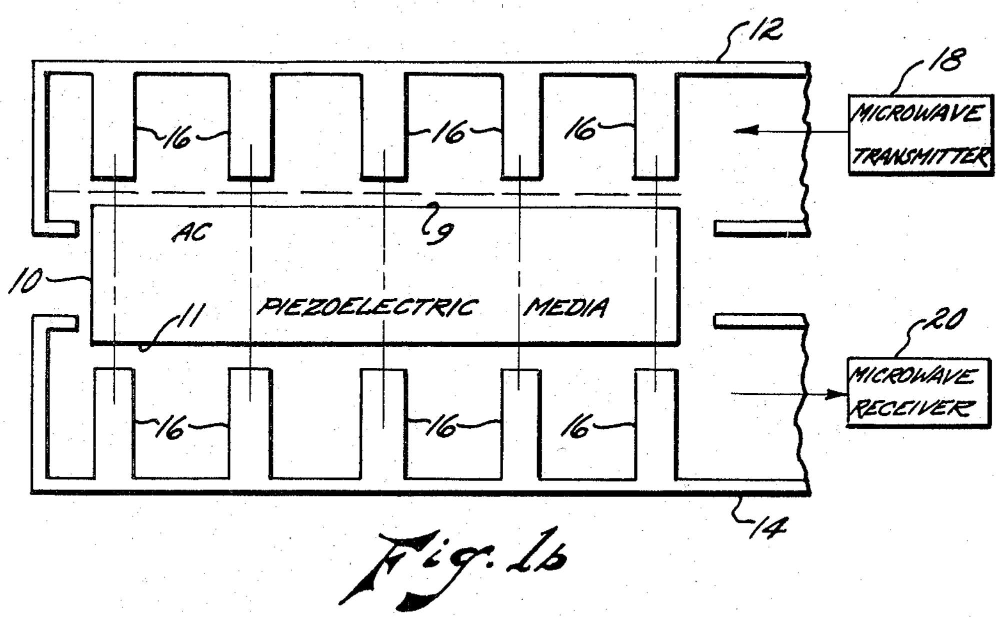
Figures 6A, 6B:
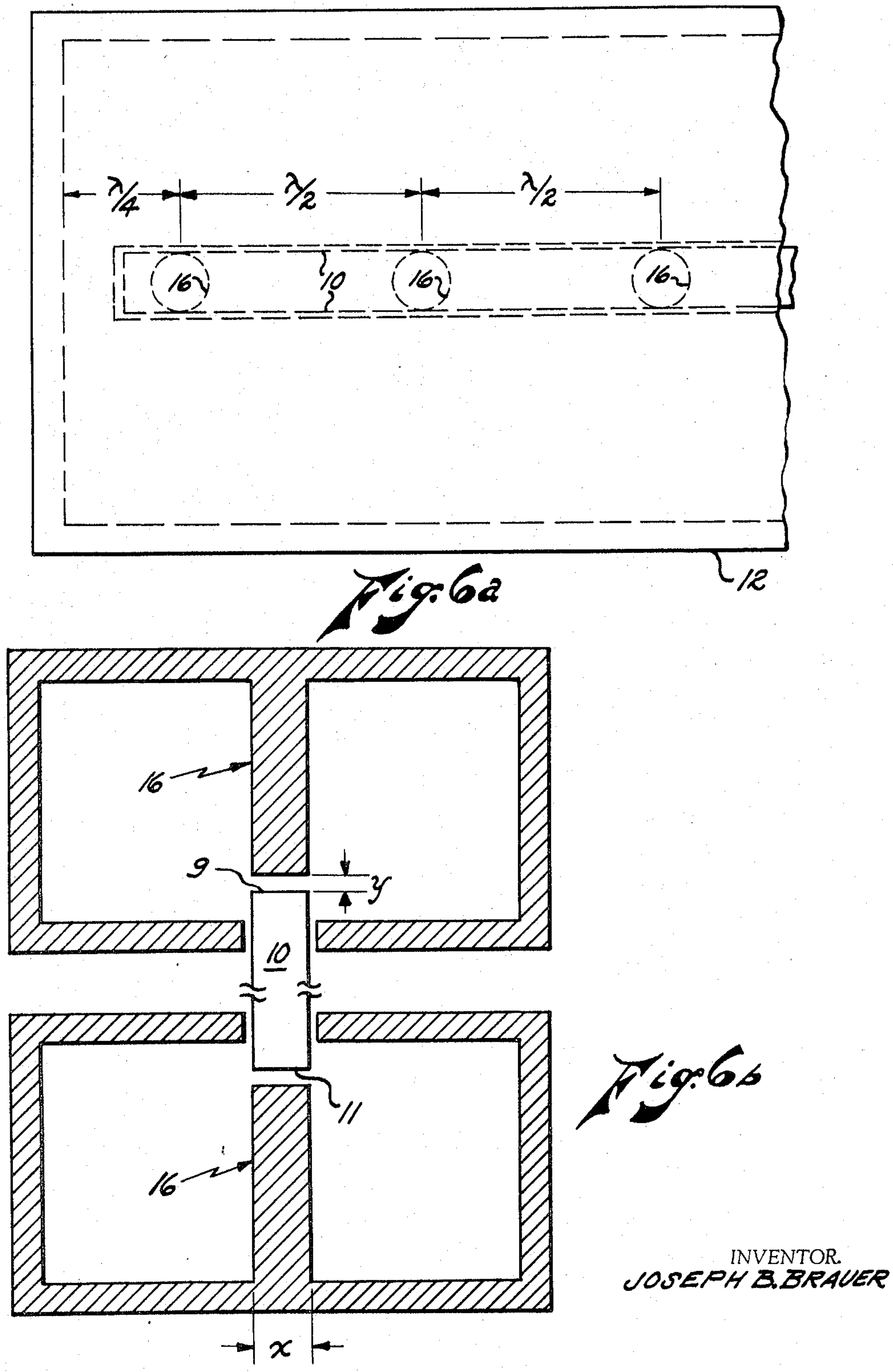

FIG. 6*a* is a top view of FIG. 1*b*; and

FIG. 6*b* is a right end view of FIG. 1*b* in cross section.

This invention is based on the principle that the acoustic propagation effect which provides the means for achieving microwave memory or delay of the electromagnetic signal can be produced using differenf microwave geometries at the input and output ends of the "delay media." As used herein, "delay media" is defined as either a continuous piezoelectric media in which the ends or faces will serve as a transducer electrically stimulated to the depths of penetration of the particular electromagnetic signal or a composite consisting of appropriately arranged piezoelectric transducers mounted on non-piezoelectric media through which the acoustic wave is propagated.

There are two general types of microwave geometries; a rectangular waveguide transmission line in which a post or probe is located so as to concentrate the electric field component of an electromagnetic signal on the face of the delay media inserted in the opposite wall of the transmission line; and a single ridged waveguide design wherein the electric field component is concentrated between the ridge and the opposite wall all along the length of the transmission line with the result that a delay media inserted in the line will be acted upon by this concentrated electric field. Either of these configurations can be terminated with an electrical short circuit in such a manner that standing waves will be generated along the direction of propagation. The electric field intensity which results is a minimum at the short and at each multiple of one-half the wavelength in the transmission line away from the short and is a maximum at the one-quarter wavelength point from the short and at each point path along the transmission line corresponding to the sum of multiples of one-half wavelength distance plus one-quarter wave length, e.g. $\lambda/4$, $3\lambda/4$, $5\lambda/4$, $7\lambda/4$, etc.

Figure 1C:
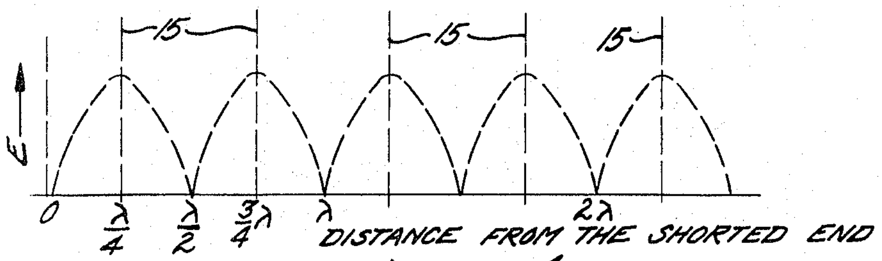

Now referring to FIG. 1*b*, which illustrates the simplest embodiment in a microwave system having a microwave frequency transmitter 18 and a microwave frequency receiver 20; i.e. when the input and output transmission lines 12 and 14 are arranged parallel to each other, and delay media 10 is a slab with transducer edges 9 and 11 parallel to each other, an effective increase in coupled coefficient or signal power transferred through the media can be achieved by using a slab of media of sufficient length in the propagation direction to contain more than one of the maximum voltage points 15 in the electrical field configuration. Reference numeral 16 refers to a cylindrical post or probe having a diameter which is small with respect to the cross section of transmission line enclosing it and with its axis located in the center of the peak voltage positions referred to by numeral 15. FIG. 6*a* is a top view of FIG. 1*b*. FIG. 6*b* is a right end view of FIG. 1*b* in cross section. In FIG. 1*b* it is to be noted that dimension X is not critical and should merely be $X<\lambda/4$; dimension Y is adjusted to achieve maximum coupling between RF and acoustic modes. In this, and in following embodiments, when the length of the delay media along the transmission line in the propagation direction encompasses a number of half wave lengths, then the response at the output end contains contributions from each of the maximum voltage positions contained along its length. The delay time of the embodiment illustrated in FIG. 1 is constant (as shown in FIG. 1*a*) and equal to the distance between transducer faces 9 and 11 divided by the sonic velocity in delay media 10.

If the delay media is of significant length in the propagation direction a small amount of dispersion might occur due to the difference in part length in the transmission lines between the near and far ends of each transducer face. The total dispersion is twice the product of the physical length of the transducer face and the propagation velocity of the wave in the transmission line. While this dispersion is small, it may be desirable to eliminate it entirely. This could be accomplished by imparting a slight taper to the delay media (making the faces non-parallel with the widest part at the end of the delay media which is nearest the signal source). The difference in width or delay path length between the near and far ends of the delay media is adjusted to exactly compensate for the corresponding differences in propogation time down the line to those respective points on the transducer faces. This compensation technique can be applied to all the device designs described herein as applicable.

Figure 2A:
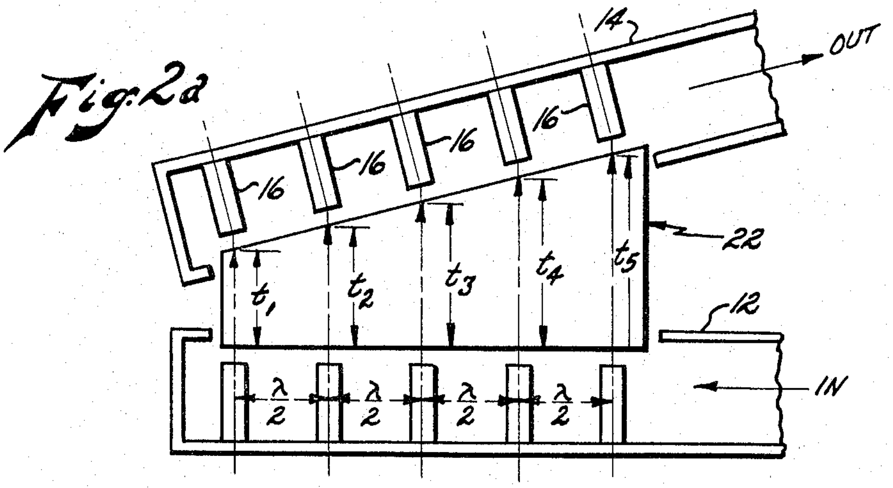
Figure 2B:
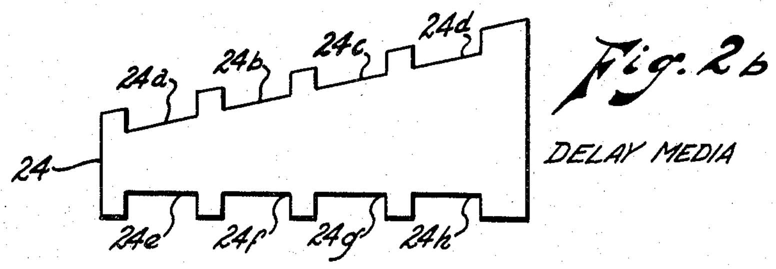

The configuration illustrated in FIG. 2*a* is employed when it is desirable to achieve a deliberate dispersive effect such that a given input signal will produce an output consisting of a number of returns each delayed by a definite amount of time. Delay media 22 is cut as a grossly tapered wedge with the taper and length in the propagation direction determined by the amount of dispersion and number of separate output signals desired. The sine wave variation of the input power points along transmission lines 12 and 14 will give a complex output signal structure. FIG. 2*b* illustrates a means for providing more discrete outputs at each maximum power point by notching or cutting away delay media 24 between these maximum power points $\mathbf{24}_{a,\ b,\ c,\ d,\ e}$, $\mathbf{24}_{f,\ g,\ \text{and}\ h}$ on the input transducer faces is illustrated.

Figure 3A:
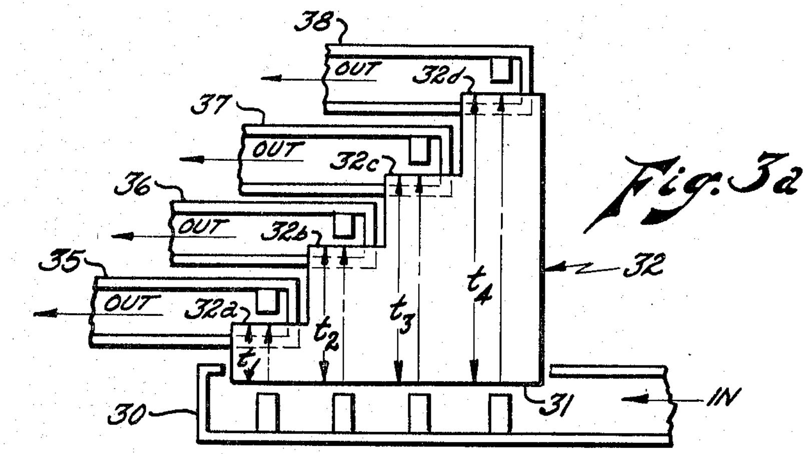
Figure 3B:
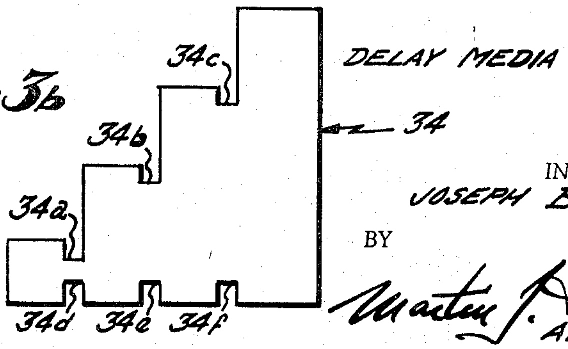

The configuration of FIG. 3*a* is employed when it is desirable to generate delay output signals which are separated from each other. A single input transmission line 30 is coupled to input tranducer face 31 of delay media 32. Media 32 is cut in step $\mathbf{32}_{a,\ b,\ c,\ d}$ corresponding to the desired individual length of delay part required, and each output transducer face is coupled to a separate output transmission line 35, 36, 37 or 38. Again, if it is desirable to provide more discrete outputs at each maximum power point, delay media 34, as illustrated in FIG. 3*b*, can be notched $\mathbf{34}_{a,\ b,\ c,\ d,\ e\ \text{and}\ f}$ between the maximum power points on the input transducer face. And by eliminating a notch in the shorting face or end, more discrete outputs at each maximum power point are provided, and also allows for most effective shorting of output transmission lines 35, 36, 37 and 38. This configuration provides a capability equivalent to that of present "tapped" delay lines.

Figure 4:
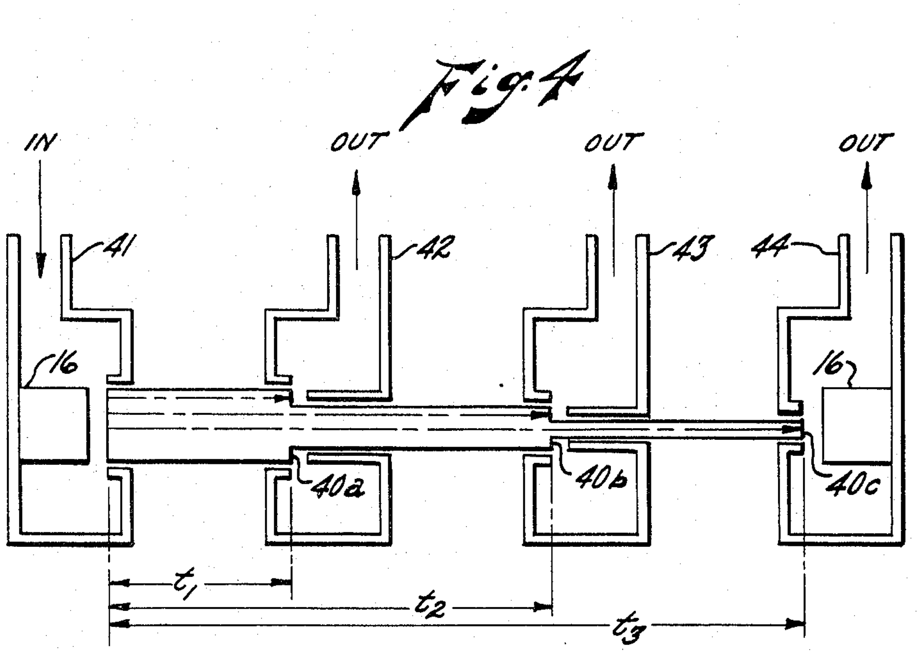
FIG. 4 is a schematic cross-section view of a reentrant cavity configuration for producing multiple delay paths of unequal length.

FIG. 4 illustrates another embodiment of the present invention employing reentrant cavities 41, 42, 43 and 44 at the input and output points with delay media 40 appropriately cut to provide the desired fraction of output signal at each output point or delay time $t_1$, $t_2$, $t_3$.

FIG. 4 illustrates a cylindrical delay media 40 with a reduction in diameter (and cross section) at each output cavity. Output transducer faces $\mathbf{40}_{a,\ b,\ c}$ are located at the surfaces of the shoulder or step and centered in cylinder 40 which couples to center post 16 of each successive cavity.

Figure 5:
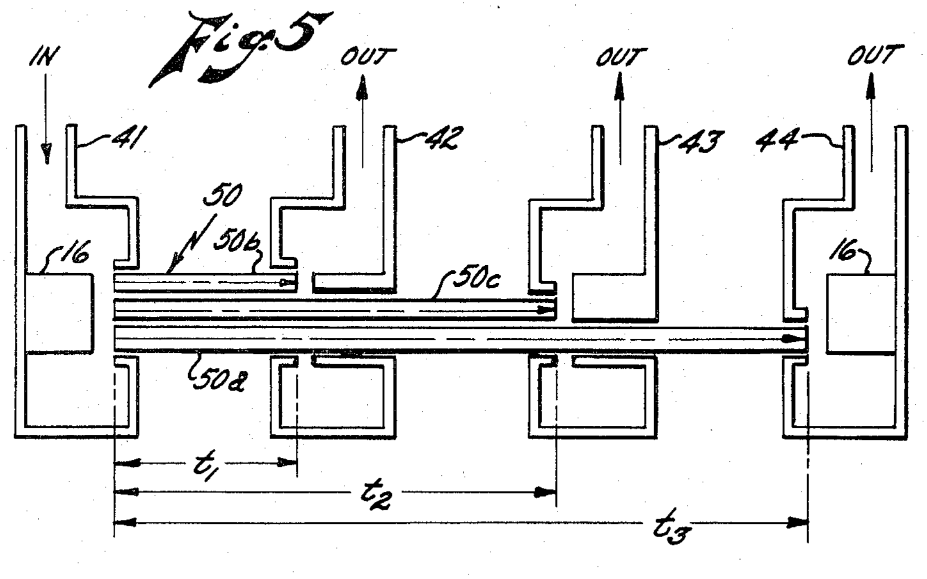
FIG. 5 is a schematic cross-section view of another reentrant cavity configuration.

FIG. 5 illustrates the use of a bundle of rods or bars 50 all of which are coupled to input cavity 41 rather than use of the step cylinder. The input signal enters all of the rods simultaneously at the input cavity. One rod $\mathbf{50}_a$ extends full length to output cavity 44 to yield delay time $t_3$; the other rods $\mathbf{50}_{b,\ c}$ terminate one at a time at each of intermediate cavities 42 and 43 to allow delay time $t_1$ and $t_2$ respectively.

Numerous and varied other arrangements and modifications of the systems disclosed herein, which employ the principles of the present invention, can be readily devised by those skilled in the art without departing from the spirit and scope of the invention. For example, double ridged waveguide, H-plane waveguide and all forms of transmission lines can be modified to produce a periodicity of response on the input and/or output ends of delay media.

I claim:

1. A microwave acoustic delay apparatus comprising an input waveguide transmission line and an output waveguide transmission line, said transmission lines arranged parallel to each other, a delay media inserted between adjacent walls of said transmission lines, each of said transmission lines having a plurality of probes located so as to concentrate the electric field component of an electromagnetic signal on the face of said delay media, and a short circuit in each of said transmission lines such that the voltage is a minimum at the shorted end and having a multiplicity of maximum voltage points along the transmission line at one-quarter wavelength from said shorted end and at successive half wave length multiples thereof along the direction of propagation of said electromagnetic signal, said delay media being of a sufficient length to contain more than one of said maximum voltage points to provide multiple delay paths of equal length to increase the effective signal power transferred across or through said delay device.

2. Microwave delay apparatus for generating unequal, delayed output signals which are separated from each other comprising a delay media having a single input face and a multiplicity of output faces, a single input transmission line having a shorted end to create a standing wave having a plurality of maximum voltage points and coupled to the input transducer face of said delay media, and a separate output transmission line having a shorted end and coupled to each of said multiplicity of output transducer faces.

3. Apparatus as described in claim 1 wherein said delay media has a plurality of slots between maximum voltage points along the length of said shorted transmission line.

4. Apparatus as described in claim 1 wherein said delay media has a plurality of notched surfaces between maximum voltage points along the length of said delay media after the first maximum voltage point from the shorting end of said shorted transmission line.

5. Microwave delay apparatus comprising, in combination, an input reentrant cavity, a plurality of output reentrant cavities, a delay media having an input transducer face coupled to said input cavity and having a plurality of output transducer faces, each of said output faces coupled to a corresponding cavity of said plurality of output cavities to produce a plurality of delay paths of unequal length with each delayed signal coupled to a separate output cavity, said delay media being cylindrical in form and said plurality of output transducer faces being formed by a stepped reduction in diameter along the length of said media at each of the coupling inputs to said plurality of output reentrant cavities.

6. Microwave delay apparatus comprising, in combination, an input reentrant cavity, a plurality of output reentrant cavities, a delay media having an input transducer face coupled to said input cavity and having a plurality of output transducer faces, each of said output faces coupled to a corresponding cavity of said plurality of output cavities to produce a plurality of delay paths of unequal length with each delayed signal coupled to a separate output cavity, said delay media comprises a plurality of bars, each having an input face and an output face, disposed such that the signal from said input cavity enters all of said input faces simultaneously, and one of said bars extending full length to the extreme output cavity and each of the remaining bars terminating one at a time at each of the intermediate cavities.

References Cited by the Examiner

UNITED STATES PATENTS

| | | | |
|---|---|---|---|
| 2,943,318 | 6/1960 | Deloraine et al. | 333—30 X |
| 2,965,851 | 12/1960 | May | 333—30 |
| 3,071,741 | 1/1963 | Brauer | 333—30 |
| 3,098,204 | 7/1963 | Brauer | 333—30 |
| 3,240,962 | 3/1966 | White | 333—30 X |
| 3,246,164 | 4/1966 | Richmond | 333—30 X |

ELI LIEBERMAN, *Primary Examiner.*

HERMAN KARL SAALBACH, *Assistant Examiner.*